United States Patent [19]

Otting

[11] Patent Number: 4,548,382
[45] Date of Patent: Oct. 22, 1985

[54] PINCH TUBE VALVE

[75] Inventor: Billy J. Otting, LaFayette, Ga.

[73] Assignee: Otting Machine Company, Inc., LaFayette, Ga.

[21] Appl. No.: 279,954

[22] Filed: Jul. 2, 1981

Related U.S. Application Data

[63] Continuation of Ser. No. 86,392, Oct. 18, 1979, abandoned.

[51] Int. Cl.⁴ ............................................. F16L 55/14
[52] U.S. Cl. .................................... 251/5; 137/625.65; 251/7
[58] Field of Search ............................ 251/5, 7, 30, 8; 137/625.65

[56] References Cited

U.S. PATENT DOCUMENTS

| | | | |
|---|---|---|---|
| 2,660,395 | 11/1953 | Mair et al. | 251/7 X |
| 2,674,435 | 4/1954 | Angell | 251/7 |
| 3,793,785 | 2/1974 | Austin | 251/7 X |
| 3,921,670 | 11/1975 | Clippard, Jr. et al. | 137/625.65 |
| 3,982,724 | 9/1976 | Citrin | 251/7 |
| 4,044,989 | 8/1977 | Basel et al. | 251/7 |
| 4,071,039 | 1/1978 | Goof | 251/7 X |
| 4,099,700 | 7/1978 | Young | 251/7 |

OTHER PUBLICATIONS

*IBM Tech. Disclosure Bulletin*, vol. 10, No. 4, Sep. 1961, Bromberg and Davenhall, "Dispensing Viscous Curable Liquids in Measured Amounts", pp. 399–400.

*Primary Examiner*—Martin P. Schwadron
*Assistant Examiner*—Sheri Novack
*Attorney, Agent, or Firm*—Kerkam, Stowell, Kondracki & Clarke

[57] ABSTRACT

A high performance pinch tube valve for accurate, reliable, high speed and precise control of relatively low viscosity fluids. The valve is particularly adapted for use in apparatus for controlled pattern dyeing of textile material, such as carpet, with liquid dye streams. The valve includes a valve block having a bore receiving a flexible tube, and a passageway communicating with and disposed generally transversely to the bore, the intersection of the bore and the passageway defining a pinch chamber. A tube pinch off member is selectively reciprocal within the passageway into the bore for forcing the flexible tube closed. The tube pinch off member comprises a piston rod and a freely-floating ball disposed between the end of the rod and the flexible tube. The pinch chamber has a flattened wall portion formed in the bore opposite the communicating passageway. Additionally, the communicating passageway has a larger diameter than the bore. There is further provided an electrically operated pneumatic valve for selectively supplying a gas under pressure to actuate the piston for pinching closed the flexible tube. The piston and the electrically operated pneumatic valve may be separate or included within a single valve body.

6 Claims, 8 Drawing Figures

PINCH TUBE VALVE

This application is a continuation of application Ser. No. 086,392, filed Oct. 18, 1979, now abandoned.

CROSS-REFERENCE TO RELATED APPLICATION

The pinch tube valve described and claimed herein finds particular application in apparatus for pattern dyeing of textile material with liquid dye streams as more particularly described and claimed in application Ser. No. 085,943, filed Oct. 18, 1979, now abandoned concurrently herewith by Billy Joe Otting, and entitled JET PATTERN DYEING OF MATERIAL, PARTICULARLY CARPET.

BACKGROUND OF THE INVENTION

The present invention relates generally to pinch tube valves and, more particularly, to an improved pinch tube valve for accurate, reliable, high speed and precise control of relatively low viscosity fluids, for example dye.

Pinch tube valves are well known in the valve art, and representative examples may be found in the following U.S. Patents: Mair et al U.S. Pat. No. 2,660,395; Citrin U.S. Pat. No. 3,982,724; Basel et al U.S. Pat. No. 4,044,989; and Goof U.S. Pat. No. 4,071,039.

By the present invention there is provided a pinch tube type valve having superior performance characteristics such as extreme speed of operation, long life, and precise on/off control. While the present valve was developed especially for use in automatic pattern carpet dyeing machines as described in the above-identified commonly-assigned U.S. patent application Ser. No. 085,943, and has characteristics making it highly suitable for that purpose, the high performance characteristics of the valve make it advantageous for other applications.

SUMMARY OF THE INVENTION

Briefly stated, and in accordance with one aspect of the invention, a pinch tube type valve is adapted to receive an elongated flexible tube for selective control of liquid flow through the tube. The valve includes a valve block having a bore for receiving the flexible tube, and a passageway communicating with and disposed generally transversely to the bore. The intersection of the bore and the passageway thus defines a pinch chamber. A tube pinch off member is selectively reciprocal within the passageway into the bore for forcing the flexible tube closed.

In accordance with an important aspect of the invention, the tube pinch off member comprises an actuated rod and a freely-floating ball disposed between the end of the actuated rod and the flexible tube.

In accordance with another important aspect of the invention, the pinch chamber has a flattened wall portion formed in the bore opposite the communicating passageway. Additionally, the communicating passageway has a larger diameter than the bore.

Preferably, the actuated rod comprises the piston rod of a pneumatically operated piston, and there is further provided an electrically operated pneumatic valve for selectively supplying a gas under pressure to actuate the piston for pinching closed the flexible tube. The piston and the electrically operated pneumatic valve may be separate or included within a single valve body.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

DETAILED DESCRIPTION OF THE PREFERRED EMBODIMENTS

Figure 1:
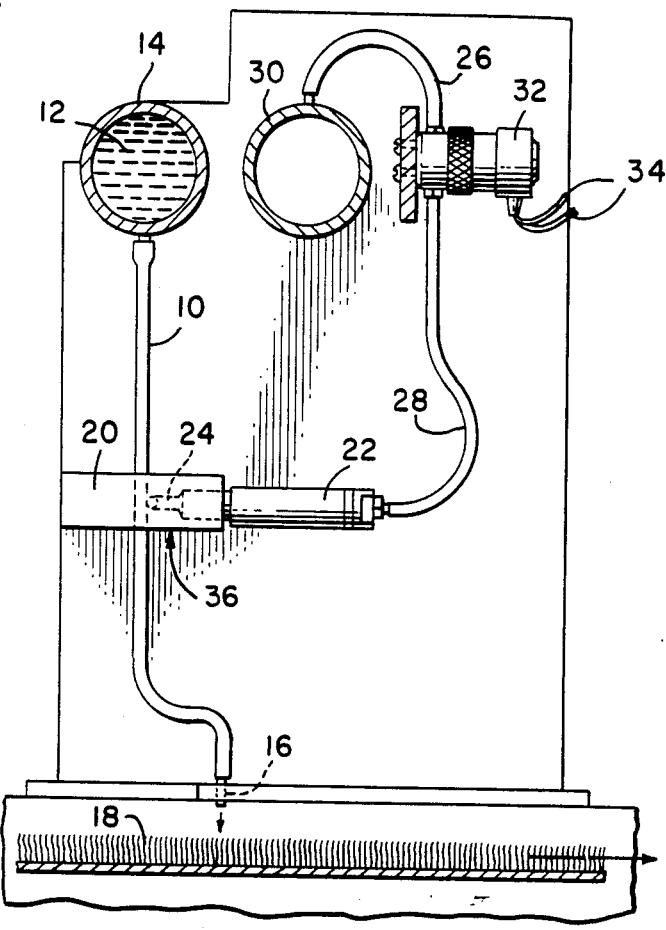
FIG. 1 is an overall view of a valve arrangement in accordance with the invention.

Referring first to FIG. 1, a pinch tube valve arrangement is provided for selective control of liquid flow through a flexible tube 10. In the particular application illustrated, the tube 10 is supplied with dye 12 under pressure from within a manifold 14, and serves to selectively supply a nozzle tube 16 for jet dyeing a moving carpet web 18 as is described in the above-identified application Ser. No. 085,943.

The flexible tube 10 passes through a valve block 20 for selective pinch off under control of a pneumatic actuator 22 comprising an actuated rod in the form of a piston rod 24. The actuator 22 is supplied via tubes 26 and 28 from an air pressure supply manifold 30 under control of an electromagnetically operated miniature air valve 32. By way of example only, and without in any way limiting the scope of the invention, the air valve 32 may comprise a model EV-3 Clippard Minimatic TM electronic/pneumatic valve, manufactured by the Clippard Instrument Company of Cincinnati, Ohio, which is believed to be substantially similar to the valve disclosed in the Clippard, Jr. et al U.S. Pat. No. 3,921,670. The pneumatic actuator 22 may be any standard actuator, such as those manufactured by the Bimba Manufacturing Company.

In the general operation of the valving arrangement as thus far described, when the air valve 32 is de-energized, air pressure within the manifold 30 supplied via the tube 26 is blocked by the valve 32. Thus the valve outlet tube 28 is not supplied with air pressure, and the piston rod 24 of the pneumatic actuator 22 is retracted. The flexible tube 10 is not pinched off, allowing dye 12 to flow freely from the dye manifold 14 through the flexible tube 10 to supply the nozzle tube 16. It should be noted that the particular air valve 32 employed has a characteristic such that the outlet port is vented to the atmosphere when the valve 32 is de-energized, allowing the pneumatic actuator 32 piston rod 24 to freely retract.

On the other hand, when the air valve 32 is energized by applying a signal in the form of twenty-four volts DC to electrical leads 34, air pressure from the air manifold 30 flows through the tubes 26 and 28 to actuate the pneumatic actuator 22, forcing a tube pinch off member 36 against the flexible tube 10, closing off the flow of dye therethrough.

With reference now to FIGS. 2-5 the construction and operation of a representative pinch tube valve assembly, and particularly that portion directly associated with the valve block 20, will now be described in greater detail.

Figure 2:
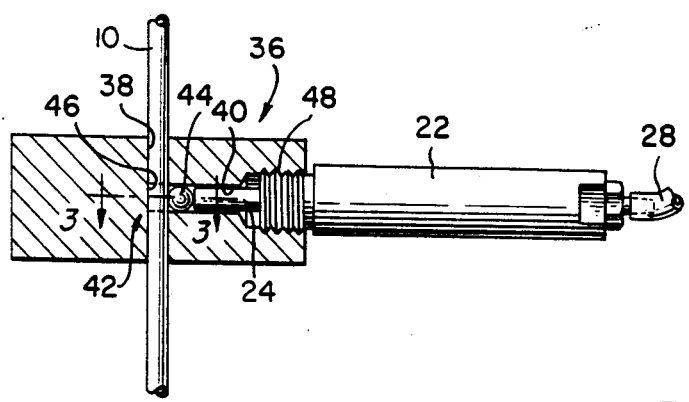
FIG. 2 is a sectional view of a portion of the FIG. 1 valve arrangement showing the internal construction of one form of pinch tube valve assembly in the tube open position, with a portion of the flexible tubing broken away to show underlying valve block details.
Figure 3:
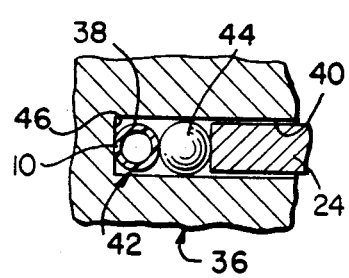
FIG. 3 is a sectional view taken along line 3—3 of FIG. 2.
Figure 4:
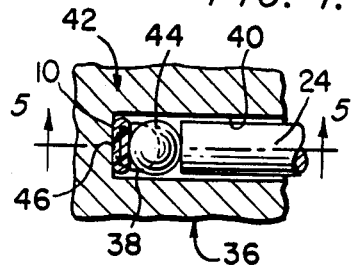
FIG. 4 is a sectional view similar to that of FIG. 3, but wherein the pinch tube valve assembly is in an actuated position to pinch off the flexible tube.
Figure 5:
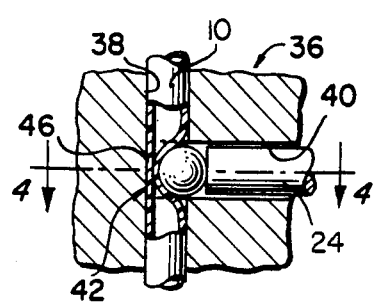
FIG. 5 is a sectional view, similar to that of FIG. 2, but on an enlarged scale, taken along line 5—5 of FIG. 4.

As noted above, the present pinch tube valve assembly is of the general type which selectively pinches closed the flexible tube 10. The valve open configuration is depicted in FIGS. 2 and 3, while the valve closed configuration is depicted in FIGS. 4 and 5.

The valve block 20 has a bore 38 receiving the flexible tube 10, and a passageway 40 communicating with and disposed generally transversely to the bore 38. The intersection of the bore 38 and the passageway 40 define and comprise a pinch chamber 42. The tube pinch off member 36 is selectively reciprocal within the passageway 40 into the bore 38 for forcing the tube 10 closed. As may be seen from FIGS. 2-5, the tube pinch off member 36 shown generally in FIG. 1, may more particularly be seen to comprise the piston rod 24 and a freely floating ball 44 disposed between the end of the piston rod 24 and the flexible tube 10.

An important aspect of the pinch tube valve assembly is that the bottom wall 46 of the bore 38 and thus of the pinch chamber 42 directly opposite the passageway 40 is flattened. This flattened portion 46 together with the freely floating ball 44 have been found to provide unusually good tube pinch off control characteristics. Additionally, the diameter of the passageway 40 which receives the piston rod 24 and ball 44 is slightly greater than the diameter of the bore 38 which receives the flexible tube 10.

The configuration of the pinch tube valve assembly may be better understood from a description of how it may be manufactured. Starting with the solid valve block portion 20, the bore 38 is formed with an ordinary circular drill extending all the way through the valve block 20. A suitable diameter for the bore 38 is 9/64 inch. Next, the passageway 40 is formed by drilling at right angles to the bore 38, and suitably machining threads as at 48 for receiving the pneumatic actuator 22. A representative diameter for the passageway 40 is 13/64 in. Next, the flattened bottom wall 46 is formed using a flat nose drill or a bottom boring tool.

After the valve block 20 is thus machined, the remaining elements are assembled thereto. The flexible tube 10 is preferably ⅛ inch outside diameter urethane tubing which, as may be seen from FIG. 1, is continuous from the dye manifold 14 to the nozzle tube 16. The 13/64 inch passageway 40 then receives a 3/16 inch diameter ball 44 and a 3/16 inch diameter piston rod 24, completing the valve assembly.

With the present valve construction, flow control is both rapid and precise, with no dripping. Moreover, relatively little force from the tube pinch off member 36 is required to pinch the flexible tube 10 closed, with the result that literally millions of successive and successful repeated actuations of the same valve have been recorded during testing without failure. With a pressure of 60 p.s.i. in the dye manifold 14, as little as 80 p.s.i. air pressure for the actuator 22 is required for reliable operation. With this particular valve arrangement, the possibility of tube failure can be even further minimized by periodically, for example during scheduled maintenance periods, slightly longitudinally moving the flexible tube 10 within the bore 38, thereby to vary the precise point of tube compression.

When such valves are employed in a carpet dyeing machine as described above, a particular attribute is substantially complete freedom from dripping, even with relatively large diameter nozzle tubes 16 and low viscosity dye 12. In operation, it can be observed that, when the dye stream is cut off, the end of the column of liquid dye within the tube 10 actually retracts somewhat (e.g., ¼ inch) from the actual end of the nozzle tube 16, positively precluding any possibility of a hanging droplet.

This highly advantageous phenomenon is presently believed to be at least in part due to several factors. First, a pinch tube valve inherently does not permit the introduction of any air whatsoever into the tube at the moment of valve closure. Not all valves share this characteristic. For example, sliding spool valves may not. Second, due to the extreme speed of valve response, particularly closure, a momentary vacuum is believed to result immediately downstream of each valve at the moment of valve closure as a column of dye traveling through a dye delivery tube tends to continue flowing by virtue of its own momentum. When the column of dye finally does stop moving or flowing, it reverses direction for a short distance as the head end of the column is drawn back up by the vacuum thus created, and the outlet end of the dye column correspondingly retracts from the end of the nozzle tube.

The somewhat surprising performance of the present valve is believed to be due to several of its constructional aspects. For reasons not fully explainable, the combination of the flattened portion 46 together with the freely-floating ball 44 are important aspects, together with the larger diameter for the communicating passageways 40 which receives the piston 24 and ball 44 compared to the diameter of the bore 38 which receives the flexible tube 10. It is believed, however, that the larger diameter of the passageway 40, which increases the size of the pinch chamber 42, provides sufficient space for the tube 10 to expand laterally as it is compressed, avoiding crimping on the sides and tiny longitudinal passageways which might otherwise remain if the tube 10 were forced to compress in a pinch chamber which was too small. Thus, the pinch chamber 42 may also be termed a tube expansion chamber. Additionally, the ball 44 is believed to provide self-centering characteristics, and thus allows a self-aligning action within the flat bottomed chamber 42.

Figure 6:
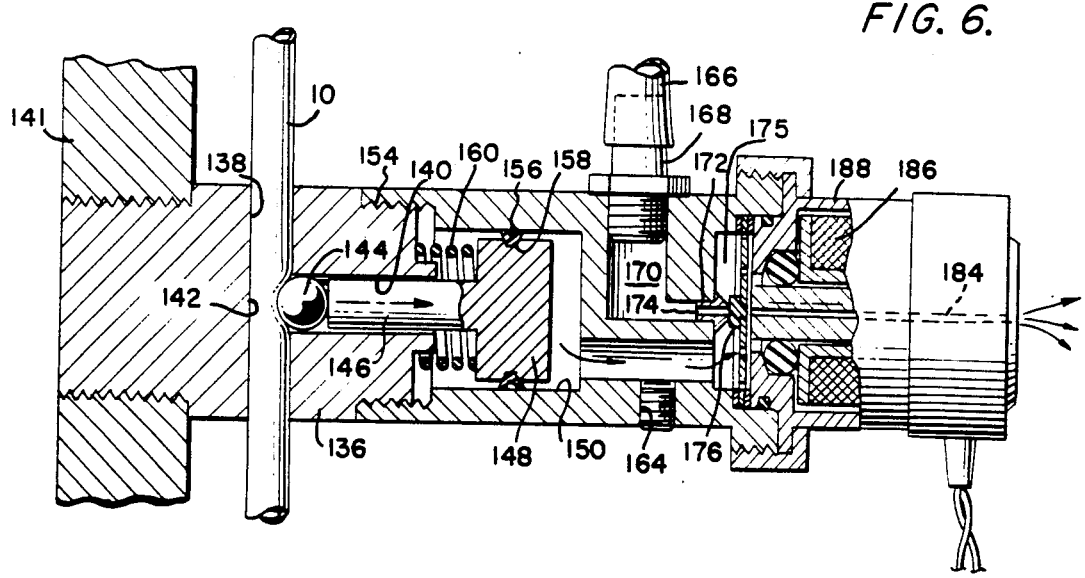
FIG. 6 is a cross sectional view of another form of pinch tube valve assembly wherein the pneumatically actuated piston as well as an electromagnetically operated valve for selectively supplying gas under pressure to actuate the piston are included in a single unit.
Figure 7:
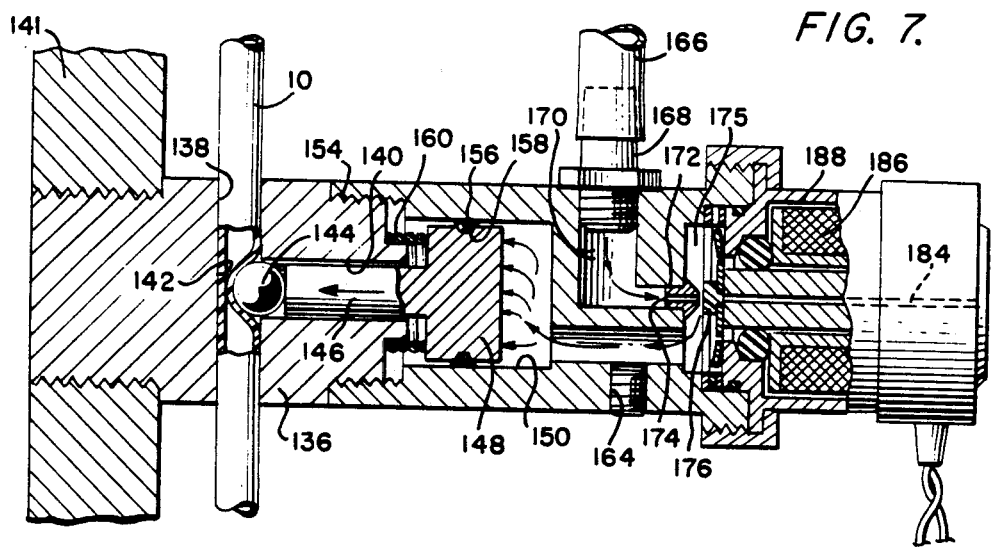
FIG. 7 illustrates the valve assembly of FIG. 6 in the actuated position wherein the flexible tube portion is pinched closed.
Figure 8:
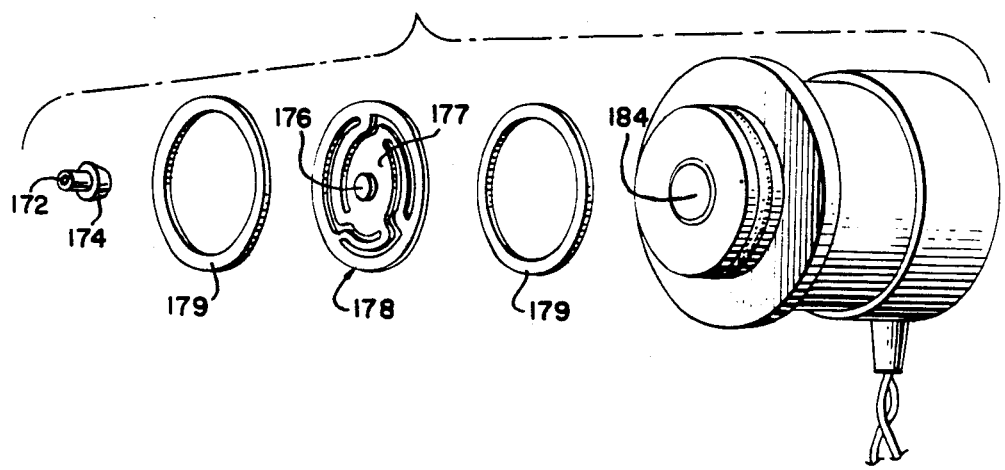
FIG. 8 is an exploded isometric view of a portion of the electrically actuated gas valve of the valve arrangement of FIGS. 6 and 7.

Referring now to FIGS. 6, 7 and 8, there is shown an alternative valve construction 130, FIG. 6 depicting the valve 130 open condition wherein dye freely flows, and FIG. 7 depicting the valve 130 closed position wherein the flexible tube 10 is closed off. The valve 130 of FIGS. 6-8 is functionally identical to the previously-described valve arrangement, but differs in that a single assembly includes a pneumatic actuator 132 corresponding to the actuator 22 of FIGS. 1-5, and an electromagnetically actuated valve portion 134 corresponding to the air valve 32 of FIG. 1.

The valve 130 includes a tube receiving portion 136 which is machined in the same manner as the valve block 20 of FIGS. 1-5, and which includes a bore 138 and a communicating passageway 140 at right angles thereto. The tube receiving portion 136 is mounted by means of threads to a support member 141. As in the previously-described embodiment, a flattened portion 142 is formed in the wall of the bore 138 opposite the passageway 140. The passageway 140 receives a ball 144 which actually bears against the tube flexible portion 64. A piston rod 146 actuated by a pneumatic piston 148 bears against the ball 144.

The piston 148 reciprocates within a cylindrical chamber 150 formed in an intermediate portion 152 screw threaded as at 154 to mate with the tube receiving portion 136. An annular seal 156 received in an annular groove 158 of the piston 148 bears against the walls of the cylindrical chamber 150, and a compression spring 160 is provided to urge the piston 148 and piston rod 146 towards the tube open position illustrated in FIG. 11.

The right-hand end of the intermediate portion 152 includes a passageway 162 for introducing air into and exhausting air from the cylindrical chamber 152 for actuation of the piston 148. A plugged bore 164 communicates with the passageway 162 for selectively controlled venting for valve modulation effects, if desired.

The electromagnetic valve portion 134 of the valve 130 may be identical to that disclosed in the above-mentioned Clippard, Jr. et al U.S. Pat. No. 3,921,670, to which reference may be had for further details. The valve portion 134 functions when actuated (FIG. 12) to permit compressed air supplied through a tube 166 and fitting 168 into a passageway 170 terminating at a small diameter bore 172 in the end of a truncated insert member 174 communicating with a chamber 175. Air in the chamber 175 is then introduced through the passageway 162 to act against the piston 168, forcing the flexible tube 10 closed. In the valve deactuated position as illustrated in FIG. 6, the small diameter bore 172 is closed off by an elastomeric button 176 carried in the central portion 177 of a spider-like spring member 178, best seen in FIG. 8. Spacer rings 179 serve to axially position the spider member 178. In the FIG. 7 valve deactuated position, the cylindrical chamber 150 is vented through the passageway 162 and the chamber 175 and through a passageway 184 to the atmosphere. This permits the piston 168 to retract to the position of FIG. 6.

The spider member central portion 177 serves as an armature selectively operated by a twenty-four volt DC electromagnetic coil 186 including suitable ferromagnetic structure 188. When the coil 186 is energized (FIG. 7), the spider armature 177 is pulled radially away from the small passageway 172 permitting compressed air introduced via the tube 166 to ultimately act on the piston 148. This also causes the elastomeric button 176 to seal off the vent passageway 184. When the electromagnetic coil 186 is not energized (FIG. 6), resilience of the spider member 178 urges the elastomeric button 176 against the small diameter passageway 172 closing off the flow of incoming compressed air, and at the same time opening the chamber 175 to the vent passageway 184.

While specific embodiments of the invention have been illustrated and described herein, it is realized that modifications and changes will occur to those skilled in the art. It is therefore to be understood that the appended claims are intended to cover all such modifications and changes as fall within the true spirit and scope of the invention.

What is claimed is:

1. A pinch tube valve assembly adapted to receive an elongated flexible tube for selective control of liquid dye flow through the tube, said valve assembly comprising:

a valve block having a bore circular in cross section extending through said block for receiving the flexible tube, a passageway in said block, said passageway also being circular in cross section and intersecting with said bore at a right angle thereto, said passageway having a diameter larger than that of said bore, the intersection of said bore and said passageway defining a pinch chamber;

an electrically operated pneumatic valve;

an intermediate block portion member supported at one end to said valve block and supporting at its other end said pneumatic valve, an air chamber formed between said other end of said intermediate block portion and the pneumatic valve; said intermediate block portion including a central chamber, piston means within said chamber having a rod section at one end and being selectively reciprocal in said passageway between a first position and a second position, a freely floating ball disposed in said passageway between one end of the rod section and the flexible tube for pinching the flexible tube into a closed condition in response to actuation of said pneumatic valve and positioning of said rod section in its second position;

spring means within said central chamber arranged to maintain said rod section in its first position while said pneumatic valve is deenergized;

an air passage in said intermediate member opening at one end into said air chamber and at its other end to said central chamber; and said pinch chamber having a flattened wall portion circular in shape in a wall of said bore opposite the intersecting passageway and said flattened wall portion having the same diameter as said intersecting passageway and lying in a plane perpendicular to said intersecting passageway so as to form an expansion chamber for said tube upon pinching thereof.

2. A valve assembly according to claim 1, wherein said piston means comprises a cylindrical head section at the other end of said rod section away from the flexible tube and positioned for reciprocal movement within said central chamber, said spring means comprising a helical compression spring disposed about said rod section and having one end positioned against the end of the valve body to which the intermediate member is supported and its other end positioned to bear against the head section of the piston means to urge the piston means to its first position.

3. A valve assembly according to claim 2 wherein said head section includes an annular seal disposed to be in a sealing engagement with the inner wall of said central chamber.

4. A valve assembly according to claim 3 further comprising an air input passage communicating with said central chamber through said electrically operated pneumatic valve for selectively supplying gas under pressure to activate said piston means for pinching closed the flexible tube.

5. A valve assembly according to claim 4 wherein said air input passage terminates in a small diameter bore for communicating with said air chamber and further including an insert control member positioned in said bore and having a central open passage therein and said pneumatic valve includes a elastomeric button adapted to be positioned to close off the central open passage of the insert control member in response to actuation of said valve.

6. A valve assembly according to claim 5 wherein said button is centrally disposed in a spring spider member.

* * * * *